United States Patent
Guo et al.

(10) Patent No.: US 11,184,914 B2
(45) Date of Patent: Nov. 23, 2021

(54) METHOD AND APPARATUS FOR IMPROVING SCHEDULING IN A WIRELESS COMMUNICATION SYSTEM

(71) Applicant: ASUSTek Computer Inc., Taipei (TW)

(72) Inventors: Yu-Hsuan Guo, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 177 days.

(21) Appl. No.: 15/977,695

(22) Filed: May 11, 2018

(65) Prior Publication Data

US 2018/0332608 A1 Nov. 15, 2018

Related U.S. Application Data

(60) Provisional application No. 62/505,242, filed on May 12, 2017.

(51) Int. Cl.
| | |
|---|---|
| H04L 29/08 | (2006.01) |
| H04L 5/00 | (2006.01) |
| H04W 76/30 | (2018.01) |
| H04W 72/04 | (2009.01) |
| H04W 72/12 | (2009.01) |
| H04W 76/28 | (2018.01) |
| H04L 29/06 | (2006.01) |

(52) U.S. Cl.
CPC ......... H04W 72/1289 (2013.01); H04L 69/28 (2013.01); H04W 76/28 (2018.02); H04W 72/042 (2013.01)

(58) Field of Classification Search
CPC ............. H04W 72/1289; H04W 76/26; H04W 72/042; H04W 72/1268; H04W 76/30; H04L 69/28; H04L 5/0053
See application file for complete search history.

(56) References Cited

U.S. PATENT DOCUMENTS

| | | | |
|---|---|---|---|
| 2008/0293426 A1* | 11/2008 | Kim | H04W 52/0216 455/450 |
| 2009/0176502 A1 | 7/2009 | Kuo | |
| 2009/0239476 A1* | 9/2009 | Womack | H04L 5/0094 455/68 |
| 2010/0020755 A1 | 1/2010 | Tseng | |

(Continued)

OTHER PUBLICATIONS

Nokia Alcatel-Lucent Shanghai Bell: "Pause-Resume Scheduling for Low Latency Uplink Transmissions", 3GPP Draft; R1-1612248_Pause Resume_Final, 3rd Generation Partnership Project (3GPP), Mobile Competence Centre ; 650, Route Des Lucioles ; F-06921 Sophia-Anti Polis Cedex ; France, vol. RAN WG1, no. Reno, Nevada, United States; 20161114-20161118 Nov. 13, 2016.

Communication pursuant to Article 94(3) EPC in corresponding EP Application No. 18171791.9, dated Sep. 26, 2019.

LG Electronics Inc et al: "Reconsideration on drx-InactivityTimer for NB-IoT", 3GPP Draft; R2-164307 Reconsideration on DRX-Inactivitytimer for NB-I0T, 3rd Generation Partnership Project (3GPP), Mobile Competence Centre; 650, Route Des Luci0les ; F-06921 Sophia-Antip0lis Cedex vol. RAN WG2, no. Nanjing, China; 20160523-20160527 May 19, 2016 (May 19, 2016), XP051112344, Retrieved from the internet.

(Continued)

*Primary Examiner* — Diane L Lo
*Assistant Examiner* — Abusayeed M Haque
(74) *Attorney, Agent, or Firm* — Skaar Ulbrich Macari, P.A.

(57) ABSTRACT

A method and apparatus are disclosed from the perspective of a UE configured with DRX. In one embodiment, the method includes the UE starting a period in response to start of an UL transmission. The method also includes the UE monitoring a puncturing indication during the period. The method further includes the UE suspending the UL transmission if the puncturing indication is received by the UE.

22 Claims, 13 Drawing Sheets

(56) References Cited

U.S. PATENT DOCUMENTS

| | | | |
|---|---|---|---|
| 2011/0053625 A1* | 3/2011 | Ishii | H04L 1/1887 455/507 |
| 2013/0121220 A1* | 5/2013 | Virtej | H04W 76/28 370/311 |
| 2014/0254538 A1 | 9/2014 | Park | |
| 2015/0124676 A1* | 5/2015 | Song | H04L 5/0005 370/311 |
| 2016/0081110 A1* | 3/2016 | Suzuki | H04L 5/0094 370/336 |
| 2016/0088534 A1* | 3/2016 | Axmon | H04W 24/10 370/252 |
| 2016/0242230 A1* | 8/2016 | Huang | H04W 28/0268 |
| 2017/0041773 A1* | 2/2017 | Fujishiro | H04W 8/005 |
| 2017/0077985 A1* | 3/2017 | Li | H04W 72/0446 |
| 2017/0171908 A1* | 6/2017 | Agarwal | H04W 52/0216 |
| 2017/0188304 A1* | 6/2017 | Lunttila | H04W 76/28 |
| 2017/0201994 A1* | 7/2017 | Lim | H04L 5/0055 |
| 2017/0202054 A1 | 7/2017 | Rathonyi | |
| 2017/0222905 A1* | 8/2017 | Leroux | H04L 43/0876 |
| 2017/0318566 A1* | 11/2017 | Deogun | H04L 1/1851 |
| 2017/0339711 A1* | 11/2017 | Belghoul | H04W 72/0446 |
| 2018/0070404 A1* | 3/2018 | Giguet | H04W 24/02 |
| 2018/0234919 A1* | 8/2018 | Tsuda | H04W 52/0216 |
| 2018/0316464 A1* | 11/2018 | Stern-Berkowitz | H04L 1/1657 |
| 2019/0110332 A1* | 4/2019 | Wikstrom | H04W 52/0229 |
| 2019/0223098 A1* | 7/2019 | Sue | H04W 52/02 |
| 2019/0357149 A1* | 11/2019 | Zhang | H04W 72/14 |
| 2020/0068620 A1* | 2/2020 | Kim | H04L 5/0053 |
| 2020/0275376 A1* | 8/2020 | Lee | H04L 1/1812 |
| 2020/0288482 A1* | 9/2020 | Yi | H04W 72/1289 |

OTHER PUBLICATIONS

European Search Report from corresponding EP Application No. 18171791.9, dated Sep. 10, 2018.

Sony: "Further considerations on using pre-emption indicator for DL URLLC/eMBB multiplexing", 3GPP Draft R1-1708251—REL-15 NR—Further Considerations on Pre-Emption Indicator V07, 3rd Generation Partnership Project (3GPP), Mobile Competence Centre; 650, Route Des Lucioles; F-06921 Sophia; vol. RAN WG1, no. Hangzhou; 20170515-20170519 May 6, 2017.

Catt: "Configurable DL control channel monitoring for power savings", 3GPP Draft; R1-1704574, 3rd Generation Partnership Project (3GPP), Mobile Competence Centre ; 650, Route Des Lucioles ; F-06921 Sophia-Antipolis Cedex ; France vol. RAN WG1, no. Spokane, USA; 20170403-20170407 Mar. 25, 2017.

Communication pursuant to Article 94(3) EPC in corresponding EP Application No. 18171791.9, dated Mar. 18, 2019.

Office Action to the corresponding Chinese Patent Application rendered by the State Intellectual Property Office (SIPO) dated Mar. 26, 2021, 9 pages.

"Consideration on UL multiplexing with short NR-PUCCH"; LG Electronics; 3GPP TSG-RAN WG1 Meeting #89 R1-1707647; May 15-19, 2017, 6 pages.

"Further Considerations on using pre-emption indicator for DL URLLC/eMBB multiplexing"; Sony; 3GPP TSG-RAN WG1 Meeting #8 9: R1-1708251; May 15-19, 2017, 11 pages.

* cited by examiner

METHOD AND APPARATUS FOR IMPROVING SCHEDULING IN A WIRELESS COMMUNICATION SYSTEM

CROSS-REFERENCE TO RELATED APPLICATIONS

The present Application claims the benefit of U.S. Provisional Patent Application Ser. No. 62/505,242 filed on May 12, 2017, the entire disclosure of which is incorporated herein in its entirety by reference.

FIELD

This disclosure generally relates to wireless communication networks, and more particularly, to a method and apparatus for improving scheduling in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment) configured with Discontinuous Reception (DRX). In one embodiment, the method includes the UE starting a period in response to start of an UL (Uplink) transmission. The method also includes the UE monitoring a puncturing indication during the period. The method further includes the UE suspending the UL transmission if the puncturing indication is received by the UE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.321 v0.0.3, NR MAC protocol specification; TS 36.321 v14.2.1, "E-UTRA MAC protocol specification"; TR 38.802, "Study on New Radio (NR) Access Technology Physical Layer Aspects"; and R2-1704411, "UL inter-UE puncturing with UE suspend", Ericsson. The standards and documents listed above are hereby expressly incorporated by reference in their entirety.

Figure 1:
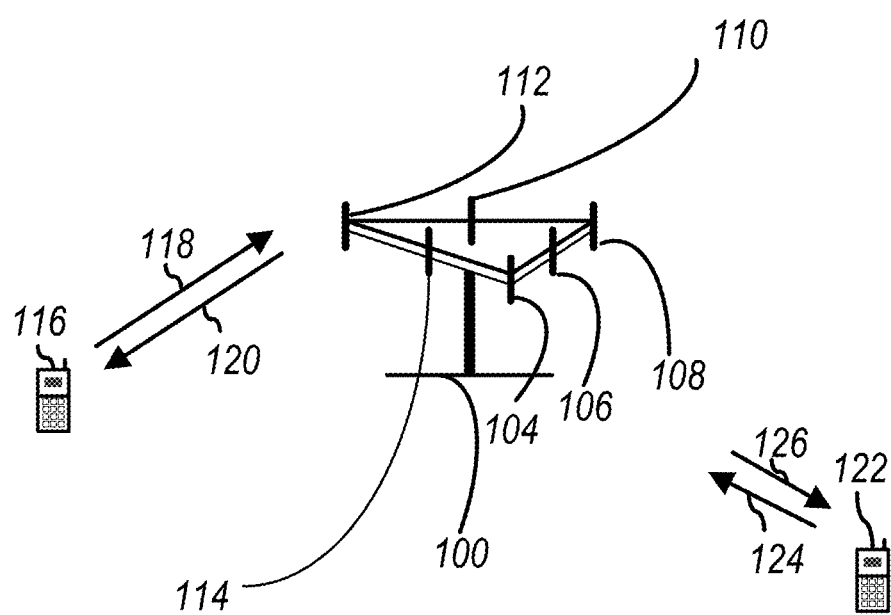
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
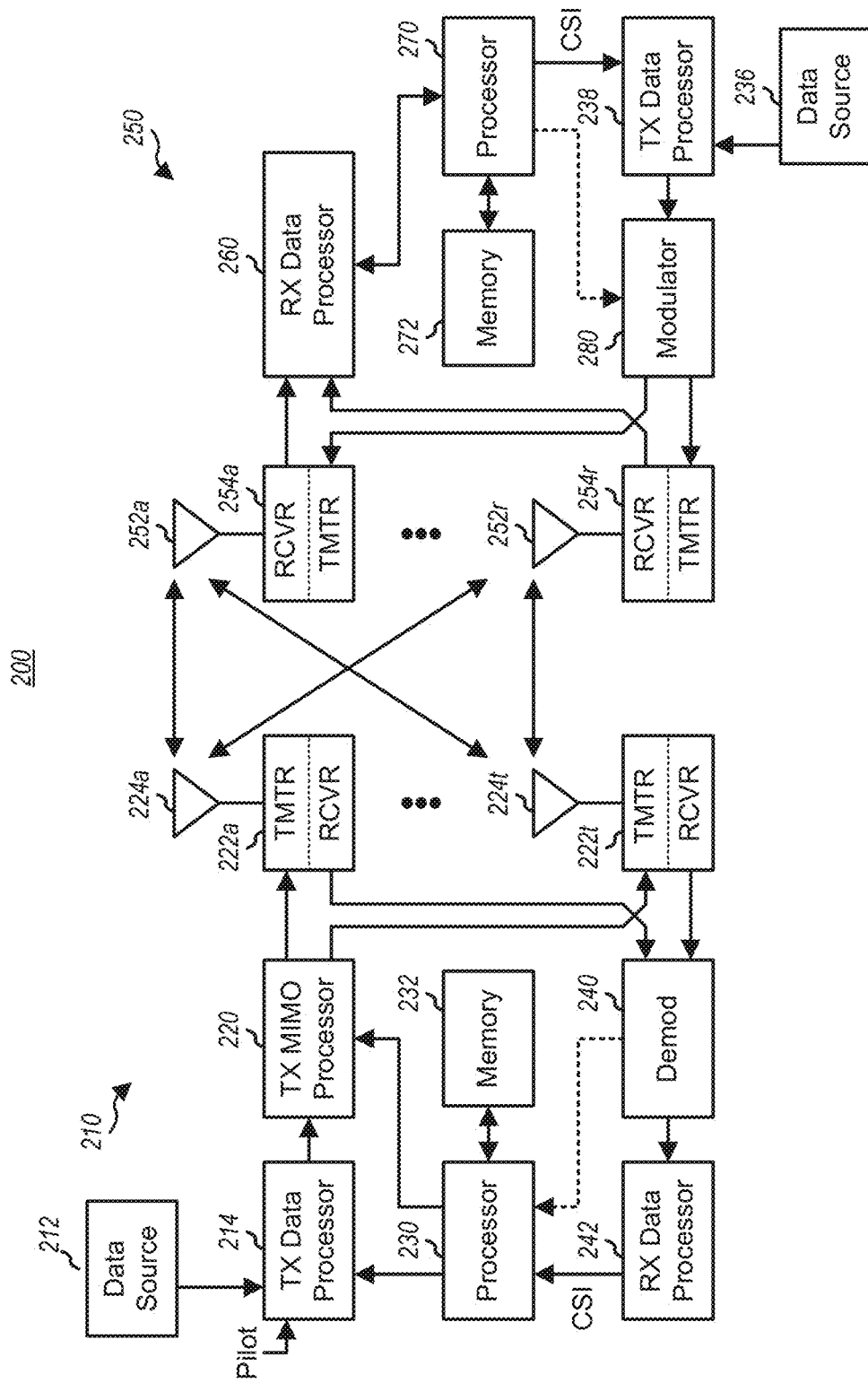
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
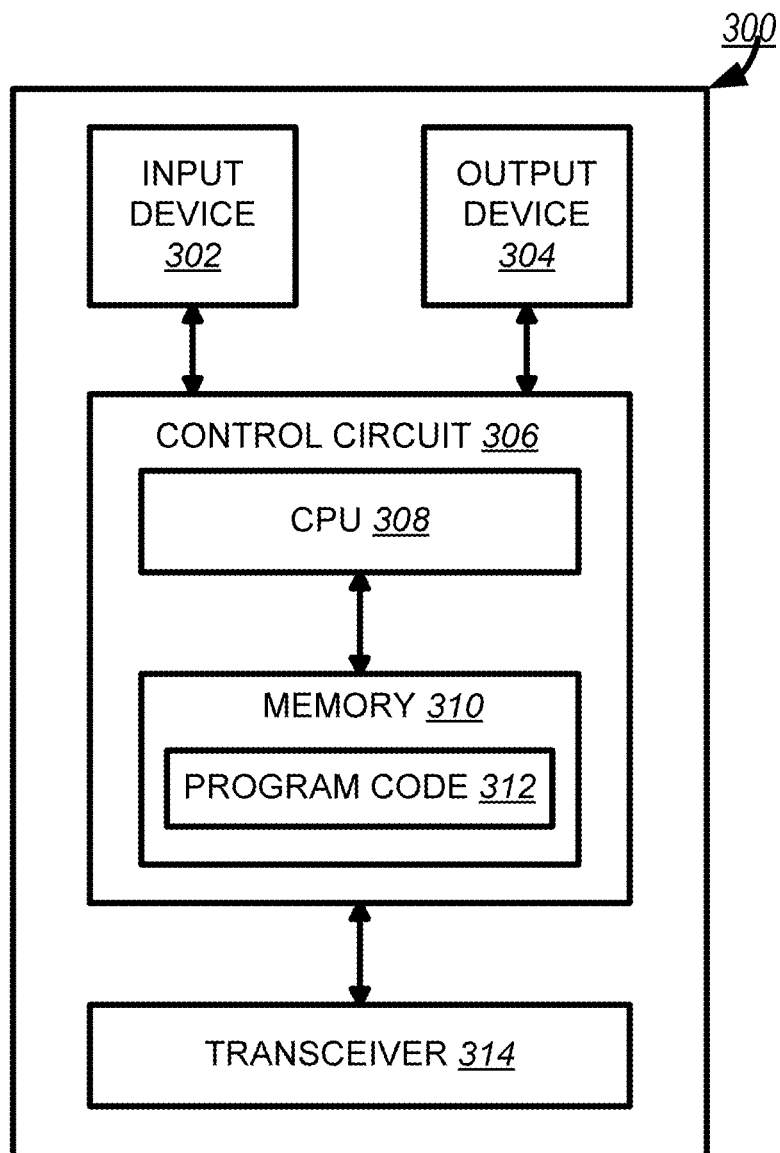
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
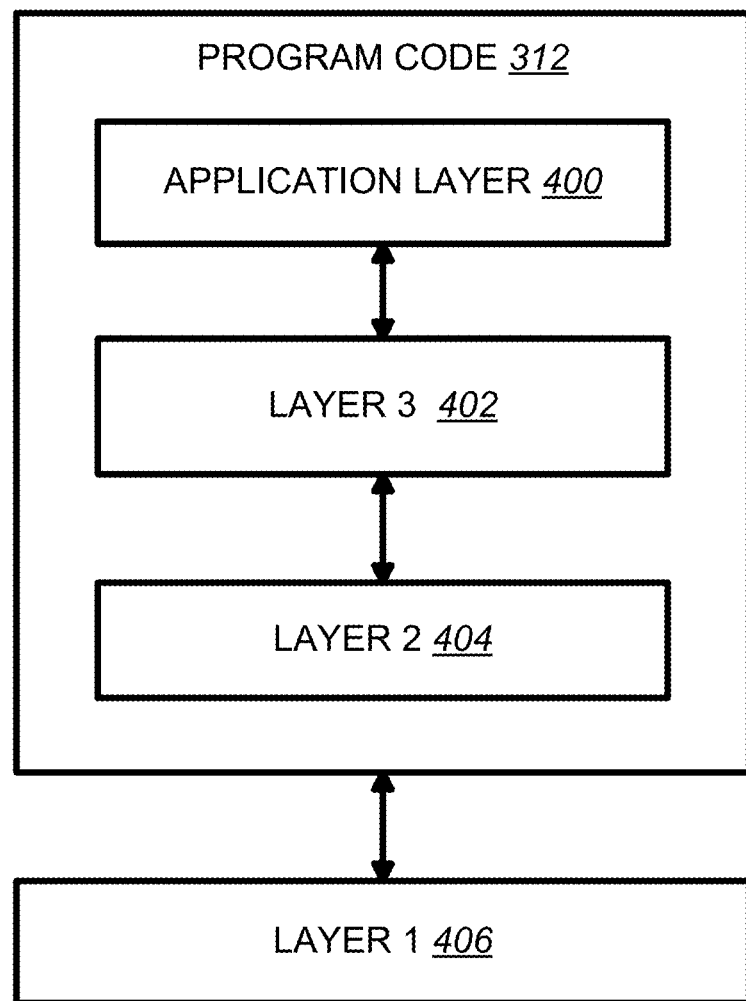
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. The next generation access technology aims to support the following three families of usage scenarios for satisfying both the urgent market needs and the more long-term requirements set forth by the ITU-R IMT-2020:

eMBB (enhanced Mobile Broadband)
mMTC (massive Machine Type Communications)

URLLC (Ultra-Reliable and Low Latency Communications)

New Radio (NR) access technology for 5G is currently under discussion, and the latest NR MAC specification can be found in 3GPP TS 38.321. NR DRX in RRC_CONNECTED is discussed in 3GPP TS 38.321 as follows:

5.7 Discontinuous Reception (DRX)

The MAC entity may be configured by RRC with a DRX functionality that controls the UE's NR-PDCCH monitoring. When in RRC_CONNECTED, if DRX is configured, the MAC entity may monitor the NR-PDCCH discontinuously using the DRX operation specified in this subclause; otherwise the MAC entity shall monitor the NR-PDCCH continuously. When using DRX operation, the MAC entity shall monitor NR-PDCCH according to requirements found in this specification. RRC controls DRX operation by configuring the timers onDurationTimer, drx-InactivityTimer, drx-Re transmission Timer, longDRX-Cycle, and shortDRX-Cycle.

Editor's note: whether to have separate drx-RetransmissionTimers for DL and UL (as in LTE) is NOT determined yet in RAN2.

Editor's note: optionality of short DRX cycle is unclear (optional in LTE), and need to confirm by RAN2.

Editor's note: The term NR-PDCCH is tentatively used to capture the agreement, but can be changed later.

Editor's note: The name of RRC parameters onDurationTimer, drx-InactivityTimer, drx-Retransmission Timer, longDRX-Cycle, and shortDRX-Cycle are tentatively used to capture the agreement, but can be changed later.

LTE DRX in RRC_CONNECTED is described in 3GPP TS 36.321 as follows:

5.7 Discontinuous Reception (DRX)

The MAC entity may be configured by RRC with a DRX functionality that controls the UE's PDCCH monitoring activity for the MAC entity's C-RNTI, TPC-PUCCH-RNTI, TPC-PUSCH-RNTI, Semi-Persistent Scheduling C-RNTI (if configured), eIMTA-RNTI (if configured), SL-RNTI (if configured), SL-V-RNTI (if configured), CC-RNTI (if configured), and SRS-TPC-RNTI (if configured). When in RRC_CONNECTED, if DRX is configured, the MAC entity is allowed to monitor the PDCCH discontinuously using the DRX operation specified in this subclause; otherwise the MAC entity monitors the PDCCH continuously. When using DRX operation, the MAC entity shall also monitor PDCCH according to requirements found in other subclauses of this specification. RRC controls DRX operation by configuring the timers onDurationTimer, drx-InactivityTimer, drx-RetransmissionTimer (one per DL HARQ process except for the broadcast process), drx-ULRetransmissionTimer (one per asynchronous UL HARQ process), the longDRX-Cycle, the value of the drxStartOffset and optionally the drxShortCycleTimer and shortDRX-Cycle. A HARQ RTT timer per DL HARQ process (except for the broadcast process) and UL HARQ RTT Timer per asynchronous UL HARQ process is also defined (see subclause 7.7).

When a DRX cycle is configured, the Active Time includes the time while:
  onDurationTimer or drx-InactivityTimer or drx-Retransmission Timer or drx-ULRetransmission Timer or mac-ContentionResolutionTimer (as described in subclause 5.1.5) is running; or
  a Scheduling Request is sent on PUCCH and is pending (as described in subclause 5.4.4); or
  an uplink grant for a pending HARQ retransmission can occur and there is data in the corresponding HARQ buffer for synchronous HARQ process; or
  a PDCCH indicating a new transmission addressed to the C-RNTI of the MAC entity has not been received after successful reception of a Random Access Response for the preamble not selected by the MAC entity (as described in subclause 5.1.4).

When DRX is configured, the MAC entity shall for each subframe:
  if a HARQ RTT Timer expires in this subframe:
    if the data of the corresponding HARQ process was not successfully decoded:
      start the drx-RetransmissionTimer for the corresponding HARQ process;
    if NB-IoT, start or restart the drx-InactivityTimer.
  if an UL HARQ RTT Timer expires in this subframe:
    start the drx-ULRetransmissionTimer for the corresponding HARQ process.
    if NB-IoT, start or restart the drx-InactivityTimer.
  if a DRX Command MAC control element or a Long DRX Command MAC control element is received:
    stop onDurationTimer;
    stop drx-InactivityTimer.
  if drx-InactivityTimer expires or a DRX Command MAC control element is received in this subframe:
    if the Short DRX cycle is configured:
      start or restart drxShortCycleTimer;
      use the Short DRX Cycle.
    else:
      use the Long DRX cycle.
  if drxShortCycleTimer expires in this subframe:
    use the Long DRX cycle.
  if a Long DRX Command MAC control element is received:
    stop drxShortCycleTimer;
    use the Long DRX cycle.
  If the Short DRX Cycle is used and [(SFN*10)+subframe number] modulo (shortDRX-Cycle)= (drxStartOffset) modulo (shortDRX-Cycle); or
  if the Long DRX Cycle is used and [(SFN*10)+subframe number] modulo (longDRX-Cycle)= drxStartOffset:
    if NB-IoT:
      if there is at least one HARQ process for which neither HARQ RTT Timer nor UL HARQ RTT Timer is running, start onDurationTimer.
    else:
      start onDurationTimer.
  during the Active Time, for a PDCCH-subframe, if the subframe is not required for uplink transmission for half-duplex FDD UE operation, and if the subframe is not a half-duplex guard subframe [7] and if the subframe is not part of a configured measurement gap and if the subframe is not part of a configured Sidelink Discovery Gap for Reception, and for NB-IoT if the subframe is not required for uplink transmission or downlink reception other than on PDCCH; or
  during the Active Time, for a subframe other than a PDCCH-subframe and for a UE capable of simultaneous reception and transmission in the aggregated cells, if the subframe is a downlink subframe indicated by a valid eIMTA L1 signalling for at least one serving cell not configured with schedulingCellId [8] and if the subframe is not part of a configured measurement gap and if the subframe is not part of a configured Sidelink Discovery Gap for Reception; or during the Active Time, for a subframe other than a PDCCH-subframe and for a UE not capable of simultaneous reception and transmission in the aggregated cells, if the subframe is a downlink subframe indicated by a valid eIMTA L1 signalling for the SpCell and if the subframe is not part of a configured measurement gap and if the subframe is not part of a configured Sidelink Discovery Gap for Reception:
  monitor the PDCCH;
  if the PDCCH indicates a DL transmission or if a DL assignment has been configured for this subframe:
    if the UE is an NB-IoT UE, a BL UE or a UE in enhanced coverage:
      start the HARQ RTT Timer for the corresponding HARQ process in the subframe containing the last repetition of the corresponding PDSCH reception;
    else:
      start the HARQ RTT Timer for the corresponding HARQ process;
    stop the drx-Retransmission Timer for the corresponding HARQ process.
    if NB-IoT, stop drx-ULRetransmissionTimer for all UL HARQ processes.
  if the PDCCH indicates an UL transmission for an asynchronous HARQ process or if an UL grant has been configured for an asynchronous HARQ process for this subframe:
    start the UL HARQ RTT Timer for the corresponding HARQ process in the subframe containing the last repetition of the corresponding PUSCH transmission;
    stop the drx-ULRetransmissionTimer for the corresponding HARQ process.
  if the PDCCH indicates a new transmission (DL, UL or SL):
    except for a NB-IoT UE configured with a single DL and UL HARQ process, start or restart drx-InactivityTimer.
  if the PDCCH indicates a transmission (DL, UL) for a NB-IoT UE:
    if the NB-IoT UE is configured with a single DL and UL HARQ process:
      stop drx-InactivityTimer.
      stop onDurationTimer.

In addition, NR supports multiple numerologies. One numerology corresponds to one subcarrier spacing in the frequency domain. By scaling a basic subcarrier spacing by an integer N, different numerologies can be defined as discussed in 3GPP TR 38.802. One TTI (Transmission Time Interval) duration corresponds to a number of consecutive symbols in the time domain in one transmission direction. Different TTI durations can be defined when using different number of symbols (e.g. corresponding to a mini-slot, one slot or several slots in one transmission direction) as described in 3GPP TR 38.802. The combination of one numerology and one TTI duration determines how transmission is to be made on the physical layer. Which numerologies and/or TTI durations a logical channel of a radio bearer is mapped to can be configured and reconfigured via RRC signalling.

In LTE, duration of an UL (Uplink) transmission may be more than one TTI (e.g. if TTI bundling is used) as discussed in 3GPP TS 36.321 as follows:
  When TTI bundling is configured, the parameter TTI_BUNDLE_SIZE provides the number of TTIs of a TTI bundle. TTI bundling operation relies on the HARQ entity for invoking the same HARQ process for each transmission that is part of the same bundle. Within a bundle HARQ retransmissions are non-adaptive and triggered without waiting for feedback from previous transmissions according to TTI_BUNDLE_SIZE. The HARQ feedback of a bundle is only received for the last TTI of the bundle (i.e the TTI corresponding to TTI_BUNDLE_SIZE), regardless of whether a transmission in that TTI takes place or not (e.g. when a measurement gap occurs). A retransmission of a TTI bundle is also a TTI bundle. TTI bundling is not supported when the MAC entity is configured with one or more SCells with configured uplink.
  Uplink HARQ operation is asynchronous for NB-IoT UEs, BL UEs or UEs in enhanced coverage except for the repetitions within a bundle serving cells configured with pusch-EnhancementsConfiguration, and serving cells operating according to Frame Structure Type 3.
  For serving cells configured with pusch-EnhancementsConfiguration, NB-IoT UEs, BL UEs or UEs in enhanced coverage, the parameter UL_REPETITION_NUMBER provides the number of transmission repetitions within a bundle. For each bundle, UL_REPETITION_NUMBER is set to a value provided by lower layers. Bundling operation relies on the HARQ entity for invoking the same HARQ process for each transmission that is part of the same bundle. Within a bundle HARQ retransmissions are non-adaptive and are triggered without waiting for feedback from previous transmissions according to UL_REPETITION_NUMBER. An uplink grant corresponding to a new transmission or a retransmission of the bundle is only received after the last repetition of the bundle. A retransmission of a bundle is also a bundle.

It is also supported in NR. The duration of a data transmission in a data channel can be semi-statically configured and/or dynamically indicated in the PDCCH (Physical Downlink Control Channel) scheduling the data transmission. For an UL transmission scheme with/without grant, K repetitions including initial transmission (K>=1) for the same transport block are supported.

UL transmission puncturing, e.g. mini-slot data from UE1 punctures slot data from UE2 (inter-UE puncturing), is discussed in 3GPP R2-1704411 as follows:
  The inter-UE puncturing, when a UE i.e. UE1 having mini-slot transmission (also called puncturing UE) to transmit on a resource granted or used by another UE i.e. UE2 having slot-transmission (also called punctured UE), may be more overlapping in time and frequency compared to the intra-UE puncturing case (i.e. when the same UE has two overlapping transmissions). In this case, UE1 does not yet have the required UL resources.
  Note that semi-persistent scheduling is supported in NR, in particular for UEs demanding low-latency UL access. However, how the collided transmissions between UEs can be distinguished is not clear yet from RAN1 perspective. Nevertheless, as the baseline a UE with mini-slot data should send SR, for the gNB to act on as it sees fit.

Observation 1 The baseline operation for any UE in need of resources, independent of puncturing, is to send SR.

An obvious problem in an inter-UE puncturing scenario is that one UE i.e. UE1 does not know the other UEs' i.e. UE2's current and/or upcoming transmissions. One solution would be to send an indication message to UE2 with slot-transmission to suspend/cancel the UL transmission. The advantage of suspending/cancelling the UL transmission of UE2 is better resource sharing and utilization. In particular, mini-slot data transmission might be infrequent and sporadic, and require a large frequency resources to meet the reliability requirements e.g. the URLLC.

As it takes time for the network to generate the indication message and the UE to process the message and stop the transmission, the network can target the scenario in which the punctured UE has a long on-going transmission duration, such as slot or multi-slots. One other scenario is that the punctured-UE's UL transmission is scheduled in the future and hasn't started yet.

Observation 2 To enable puncturing, the network may, e.g. upon receiving SR for high priority data from a UE (i.e. the puncturing UE), send a suspend message to another UE (i.e. the punctured UE) to suspend its scheduled or ongoing transmission.

The suspend message might be sent during or even before the punctured UE's scheduled UL resources. In this case, proper actions at the UE side need to be clarified. The suspend message could be an UL grant for retransmission, i.e. with NDI not toggled. After receiving this UL grant, the UE suspends the on-going transmission or cancels the scheduled transmission (i.e., interpreting that the current transmission fails), and re-transmits later according to the timing of the newly received UL grant. We note that the UE needs to perform actions on the physical layer (suspend the transmission) and actions on MAC (reschedule the transmission). The actions on physical layer need to be confirmed by RAN1.

Proposal 1 The UE shall suspend an ongoing transmission if it receives an UL grant with NDI not toggled if the grant contains the same HARQ process ID as the ongoing transmission (pending RAN1 agreements).

Proposal 2 The MAC entity shall suspend or reschedule a future transmission on a HARQ process if it receives an UL grant for the same HARQ process with NDI not toggled and trigger a retransmission according to the new grant, similar to LTE.

The UE might need time to stop the transmission, but the stopping time should be in general smaller than the smallest time to prepare for a new data transmission, i.e., the time between receiving an UL grant and the data transmission. This timing of new data preparation information is conveyed in the UE category, and will be available. So as starting point, the processing time to stop the ongoing transmission can simply be the same as the processing time for starting the retransmission.

This requires that punctured UE is configured to monitor the UL grant at short intervals, so that this message could be received. This might be problematic in TDD, since the message cannot be sent while UE is transmitting during the UL period. However, this can be useful for the scenario where the punctured UE also needs to monitor on the mini-slot level for other low-latency services running on mini-slots. This could also be useful for the case in which the punctured UE is allocated multiple granted slots and monitors only slot-level PDCCH.

Observation 3 A UE with slot-level transmissions needs to monitor PDCCH to receive the suspend message. This is configured by the network.

It should be underlined that monitoring of PDCCH is configured by the network. Some UEs may be configured to read PDCCH often, while others are not. With the additional tool of UE suspend the network can free up appropriate resources to schedule mini-slot data for, for example, URLLC data with high reliability requirement.

Observation 4 Even if not all UEs can be suspended in time, the possibility of UE suspend helps the scheduling of puncturing UE with mini-slot data.

In order to prevent interference, a first UE needs to know that an UL transmission should not be performed by the first UE if the UL resources for the UL transmission are re-allocated to a second UE, e.g. for another UL transmission to be performed by the second UE with higher priority or requiring lower latency. For example, an UL transmission for eMBB may be punctured by an UL transmission for URLLC. Therefore, a network node (e.g. gNB or TRP) needs to inform the first UE (e.g. by a DL control signaling) to puncture the UL transmission which is to be transmitted or is transmitted.

However, when the first UE is configured with DRX, the first UE may not always monitor DL control signaling, e.g. on NR-PDCCH or PDCCH. If the network node would like to inform the first UE to puncture an UL transmission while the first UE does not monitor DL control signaling, the first UE cannot be informed in time and may still perform the UL transmission which would result in interference.

Figure 5:
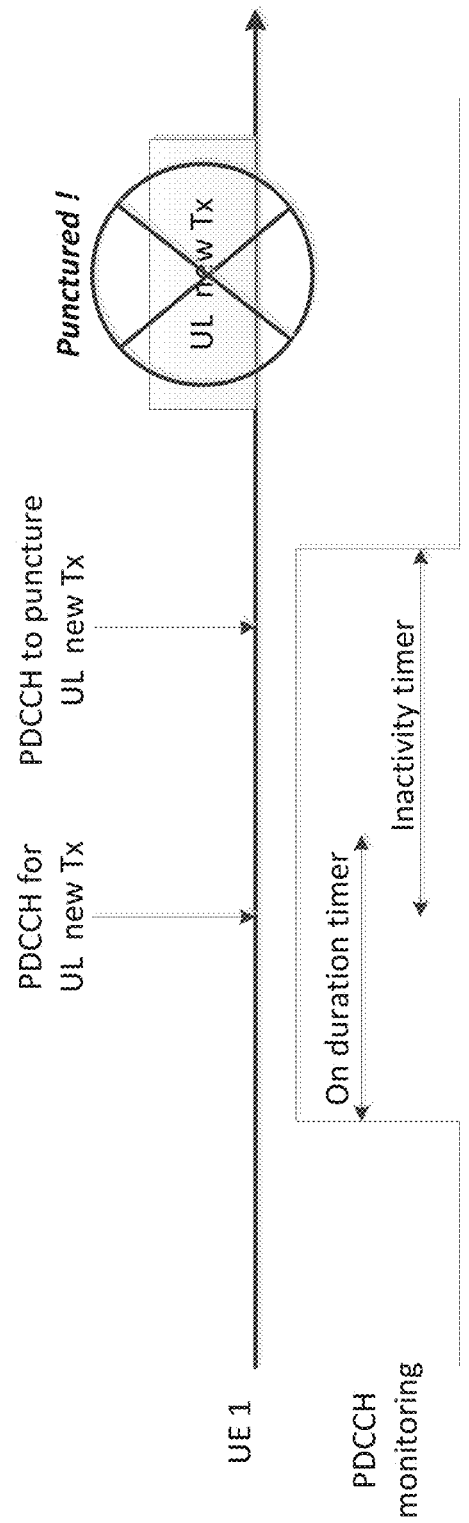
FIG. 5 illustrates an example of puncturing a new UL (Uplink) transmission according to one exemplary embodiment.
Figure 6:
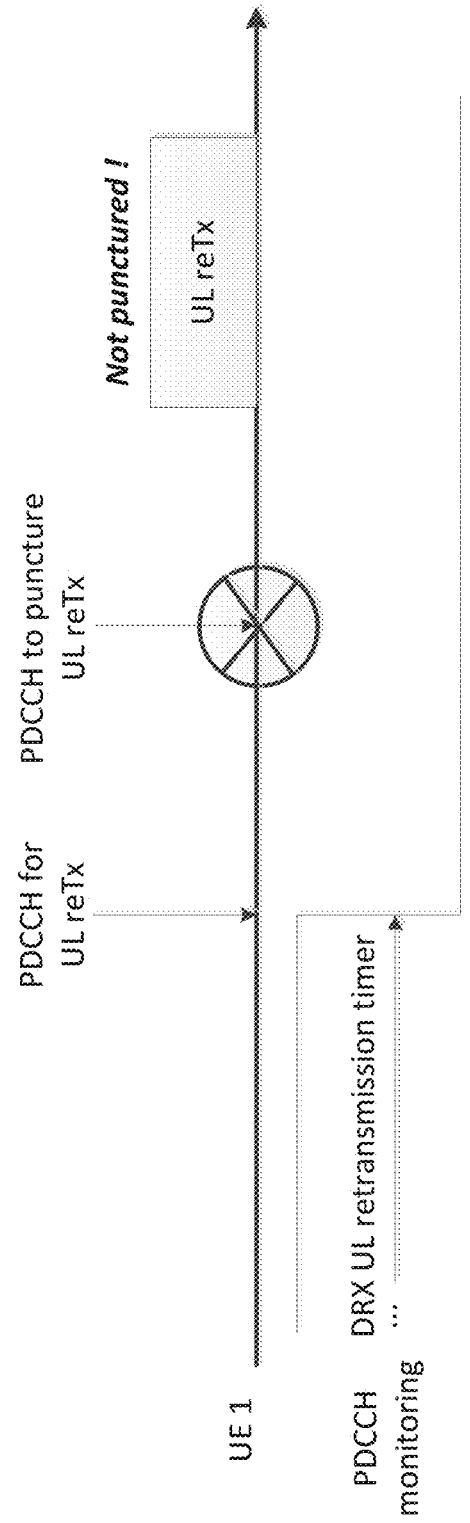
FIG. 6 shows an exemplary problem with puncturing an UL retransmission according to one exemplary embodiment.

Currently, DRX inactivity timer is started (or restarted) if the UE receives a PDCCH indicating a new UL transmission. The UE would monitor PDCCH when the DRX inactivity timer is running. The network node could transmit a DL control signaling to the UE to puncture the new UL transmission when the DRX inactivity timer of the UE is running. An example is illustrated in FIG. 5. However, an UL retransmission is also possible to be punctured. A UE may not monitor PDCCH after receiving a PDCCH transmission indicating UL retransmission since DRX UL retransmission timer may be stopped. An example is illustrated in FIG. 6.

Figure 7:
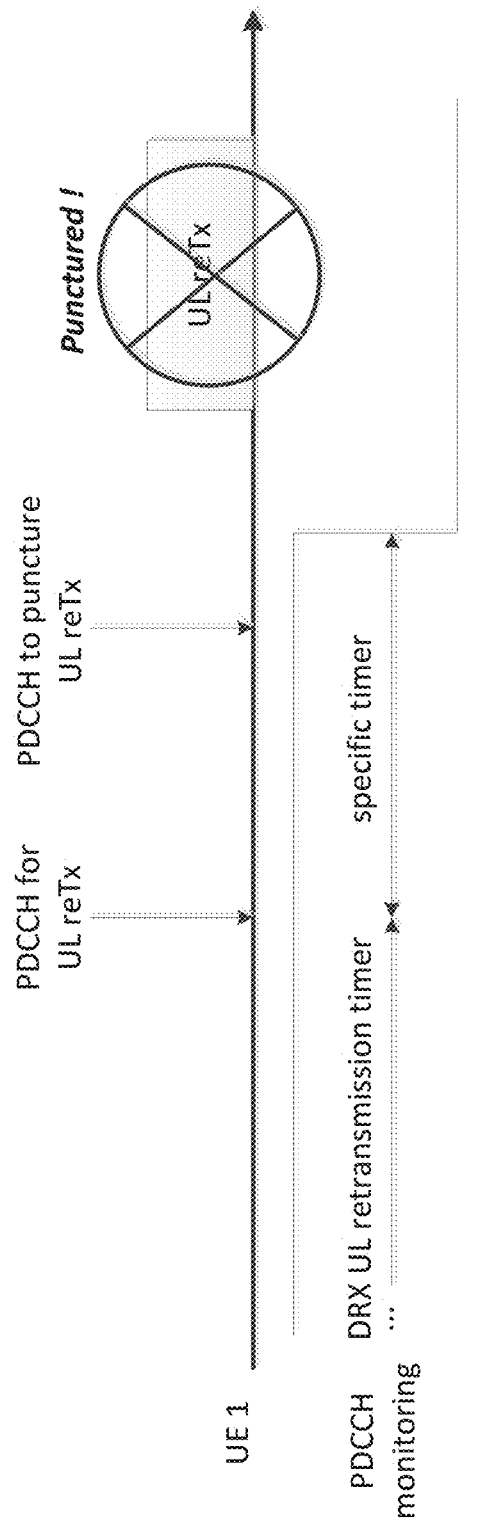
FIG. 7 illustrates an exemplary solution of puncturing an UL retransmission according to one exemplary embodiment.
Figure 8:
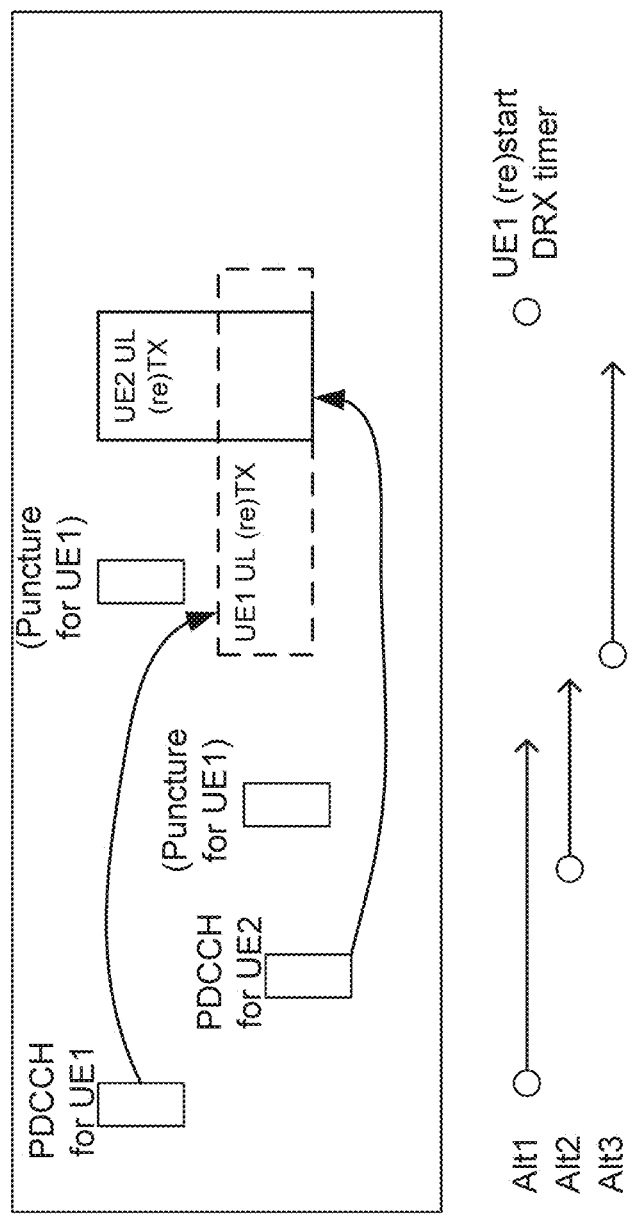
FIG. 8 shows alternatives to puncture a new UL transmission or an UL retransmission according to one exemplary embodiment.

To solve the issue, DRX should be improved to allow a UE to monitor DL control signaling (for puncturing indication) in a specific period between reception of scheduling information for an UL transmission and occurrence of the UL transmission. A specific period (or a specific timer) could be started (or restarted) if the UE receives a DL control signaling, e.g. on NR-PDCCH or PDCCH, to schedule an UL retransmission. The specific timer could be DRX inactivity timer, DRX (UL) retransmission timer (associated with a HARQ process for the UL retransmission), or a new timer for monitoring puncturing indication. The specific period (or the specific timer) for monitoring puncturing indication may not be started (or restarted) if the UE receives the DL control signaling to schedule a new UL transmission. An example is illustrated in FIG. 7. Another example is shown in alt1 and alt2 of FIG. 8.

Timing to start or restart the specific period (or the specific timer) could be in a TTI (or subframe or slot or mini slot or (NR)PDCCH occasion) that the DL control signaling to schedule the UL retransmission is received. Alternatively, timing to start or restart the specific period (or the specific timer) could be in next (or later) TTI (or subframe or slot or mini slot or (NR)PDCCH occasion) of a TTI (or subframe or slot or mini slot or (NR)PDCCH occasion) that the DL control signaling to schedule the UL retransmission is received. For example, if the DL control signaling to schedule the UL retransmission is received in TTI n, the specific period (or the specific timer) is started or restarted in TTI n, n+1, or n+y. Alternatively, timing to start or restart the specific period (or the specific timer) could be in a TTI (or subframe or slot or mini slot or (NR)PDCCH occasion) before performing the UL retransmission. For example, if (beginning of) the UL retransmission is in TTI n, the specific period (or the specific timer) is started or restarted in TTI n−y. y may be configured by network or a fixed value.

Figure 9:
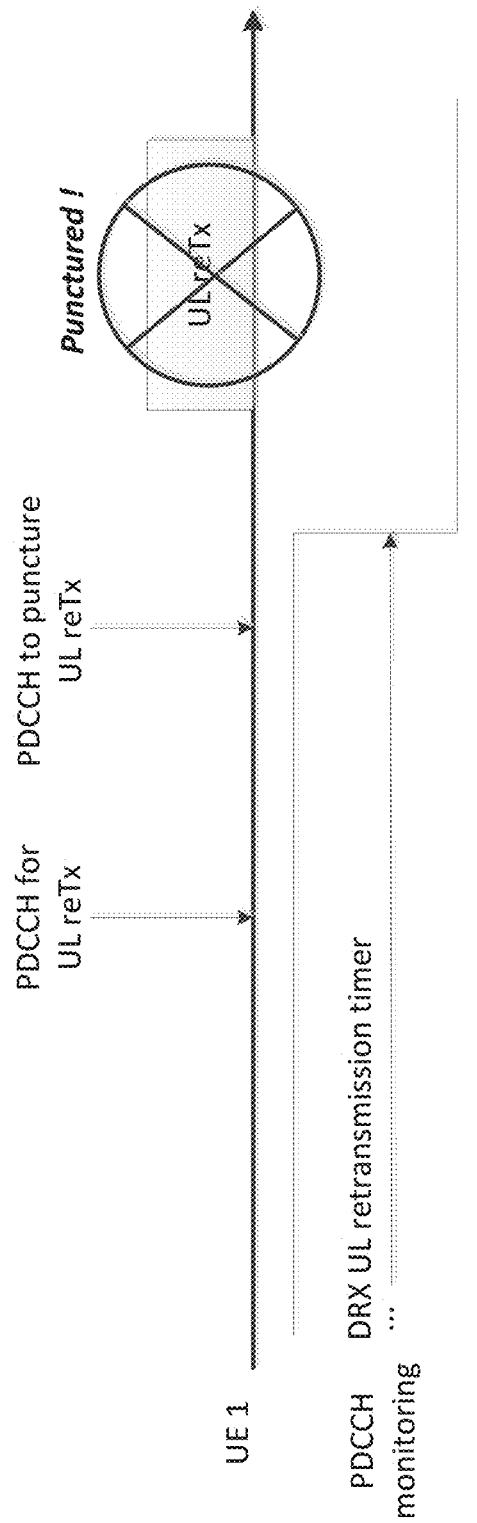
FIG. 9 illustrates an exemplary solution to puncture an UL retransmission according to one exemplary embodiment.

Alternatively, a specific timer is not stopped in response to reception of a DL control signaling to schedule an UL (re)transmission. The specific timer could be a DRX (UL) retransmission timer. The DRX (UL) retransmission timer is associated with the UL (re)transmission, e.g. corresponding to the same HARQ process. An example is illustrated in FIG. 9.

To solve the issue in another aspect, DRX should be improved to allow the UE to monitor DL control signaling (for puncturing indication) in a period between the start of an UL transmission and the end of the UL transmission, e.g. if the UL transmission lasts more than one TTI (due to repetitions or TTI bundling as discussed in 3GPP TS 36.321). As a result, a specific period (or a specific timer) could be started (or restarted) if the UE starts the UL transmission. The specific timer could be DRX inactivity timer, DRX (UL) retransmission timer, or a new timer for monitoring puncturing indication. The UL transmission may be a new transmission or a retransmission. An example is illustrated in alt3 of FIG. 8.

Timing to start or restart the specific period (or the specific timer) could be in a beginning TTI (or subframe or slot or mini slot) of the UL transmission. Alternatively, timing to start or restart the specific period (or the specific timer) could be in next (or later) TTI (or subframe or slot or mini slot) of a beginning TTI (or subframe or slot or mini slot) of the UL transmission. For example, if the beginning TTI of the UL transmission is TTI n, the specific period (or the specific timer) is started or restarted in TTI n, n+1, or n+y. y may be configured by network or a fixed value.

Whether to start or restart the specific period (or the specific timer), e.g. DRX inactivity timer, DRX (UL) retransmission timer, or timer for monitoring puncturing indication, in a condition mentioned above could be based on characteristic of the UL (re)transmission. For example, if the UL (re)transmission would not be punctured, the specific period (or the specific timer) is not started or restarted. If the UL (re)transmission could be punctured, the specific period (or the timer) could be started or restarted. As discussed in 3GPP TS 36.321, starting or restarting the specific timer in a legacy condition, e.g. expiry of (UL) HARQ RTT timer or reception of a scheduling information for new (UL) transmission, does not need to be based on the characteristic of the UL (re)transmission.

Whether to stop the specific timer, in a condition mentioned above could be based on characteristic of the UL (re)transmission. For example, if the UL (re)transmission would not be punctured, the specific timer could be stopped. If the UL (re)transmission could be punctured, the timer is not stopped.

Whether an UL (re)transmission could be punctured could be based on, e.g. (1) configuration provided by network node, (2) numerology associated with (a logical channel corresponding to) the UL (re)transmission, (3) TTI duration associated with (a logical channel corresponding to) the UL (re)transmission, (4) priority associated with (a logical channel corresponding to) the UL (re)transmission, (5) QoS associated with the UL (re)transmission, and/or (6) whether the UL (re)transmission is for URLLC. For example, if the UL (re)transmission is associated with a first numerology (or TTI duration), e.g. largest TTI duration, the UL (re)transmission could be punctured. If the UL (re)transmission is associated with a second numerology (or TTI duration), e.g. shortest TTI duration, the UL (re)transmission would not be punctured. For example, if the UL (re)transmission is for eMBB, the UL (re)transmission could be punctured. If the UL (re)transmission is for URLLC, the UL (re)transmission would not be punctured.

Length of the specific period (or the specific timer) could be based on, e.g. (1) configuration provided by network node, (2) numerology associated with (a logical channel corresponding to) the UL (re)transmission, (3) TTI duration associated with (a logical channel corresponding to) the UL (re)transmission, (4) priority associated with (a logical channel corresponding to) the UL (re)transmission, (5) QoS associated with the UL (re)transmission, (6) whether the UL (re)transmission is for URLLC, (7) duration of the UL (re)transmission, (8) repetition times of the UL (re)transmission, and/or (9) TTI bundle size (as discussed in 3GPP TS 36.321) of the UL (re)transmission.

The end of the specific period could be (1) the beginning of the UL (re)transmission, (2) just before the beginning of the UL (re)transmission, (3) the end of the UL (re)transmission, (4) immediately after the end of the UL (re)transmission, and/or (5) timing of the specific timer expiry.

In one embodiment, there could be one specific timer for one MAC entity. Alternatively, there could be one specific timer for one HARQ process.

In one embodiment, the UE could change DRX cycle based on expiry of the specific timer.

In one embodiment, the UE could stop the specific period (or the specific timer) in response to reception of a MAC control element, e.g. DRX Command MAC control element. The UE could stop the specific period (or the specific timer) when the puncturing indication is received.

In one embodiment, during the specific period (or the running of the specific timer), the UE monitors a signaling (e.g. the puncturing indication) to indicate UL transmission puncturing. The UE may or may not start or restart the specific period (or the specific timer) in response to reception of the signaling to indicate UL transmission puncturing.

The signaling to indicate UL transmission puncturing (e.g. puncturing indication) could be transmitted on PDCCH or NR-PDCCH. Alternatively, the signaling could be indicated by a MAC control element. The signaling could indicate an identity of a HARQ process, wherein UL transmission, transmitted by or is to be transmitted by the HARQ process, is punctured, e.g. cancelled, not transmitted, suspended, or stopped. HARQ buffer associated with the punctured UL transmission could be kept or not flushed due to puncturing. The signaling could request the UE to perform retransmission of the punctured UL transmission, e.g. based on NDI (New Data Indicator). The signaling could indicate radio resources for retransmission of the punctured UL transmission.

The UL (re)transmission could be (dynamically) scheduled by the DL control signaling. Alternatively, the UL (re)transmission could use a configured uplink grant which is periodically available.

Figure 10:
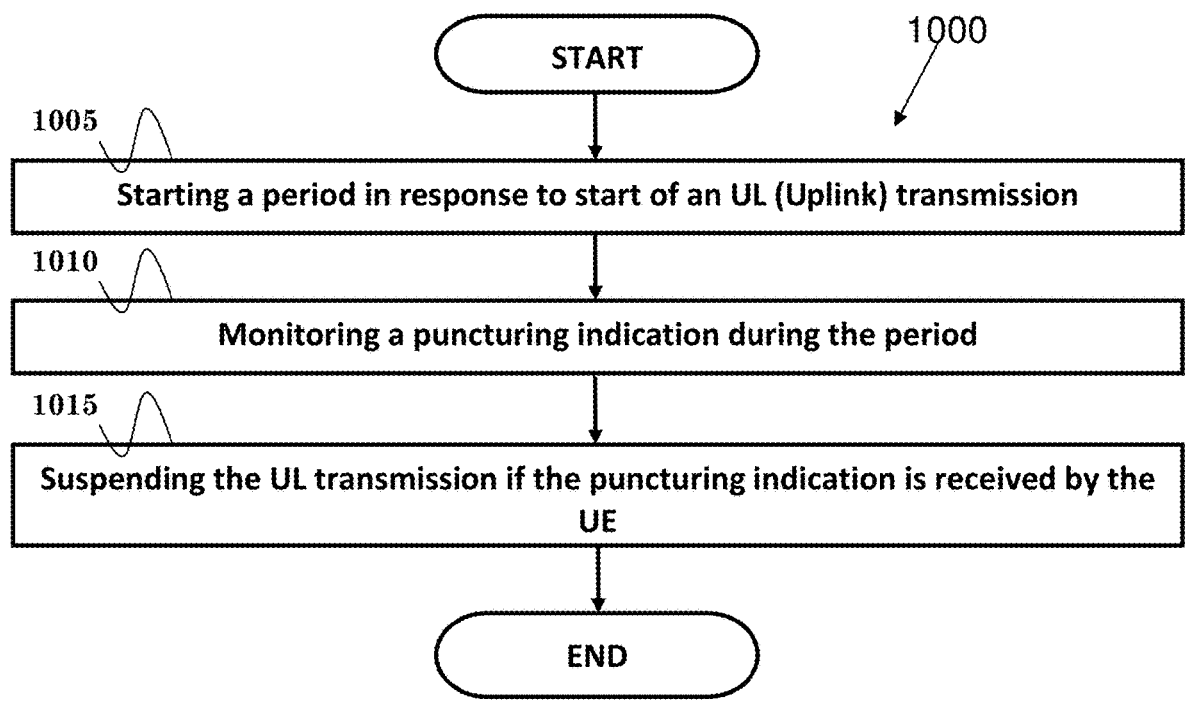
FIG. 10 is a flow chart according to one exemplary embodiment.

FIG. 10 is a flow chart 1000 according to one exemplary embodiment of a UE configured with DRX. In step 1005, the UE starts a period in response to a start of an UL transmission. In step 1010, the UE monitors a puncturing indication during the period. In step 1015, the UE suspends the UL transmission if the puncturing indication is received by the UE.

In one embodiment, the period could be started at a timing when the UL transmission is started. Alternatively, the period could be started at a timing offset before the UL transmission is started. The period could be controlled by a timer. The timer could be a DRX inactivity timer or a DRX UL retransmission timer. The period could end in response to an end of the UL transmission. Alternatively, the period could end in response to a start of the UL transmission. The UL transmission could be a new transmission or a retransmission.

Referring back to FIGS. 3 and 4, in one exemplary embodiment of a UE configured with DRX, the device 300 includes a program code 312 stored in the memory 310. The CPU 308 could execute program code 312 to enable the UE (i) to start a period in response to a start of an UL transmission, (ii) to monitor a puncturing indication during the period, and (iii) to suspend the UL transmission if the puncturing indication is received by the UE. Furthermore, the CPU 308 can execute the program code 312 to perform all of the above-described actions and steps or others described herein.

Figure 11:
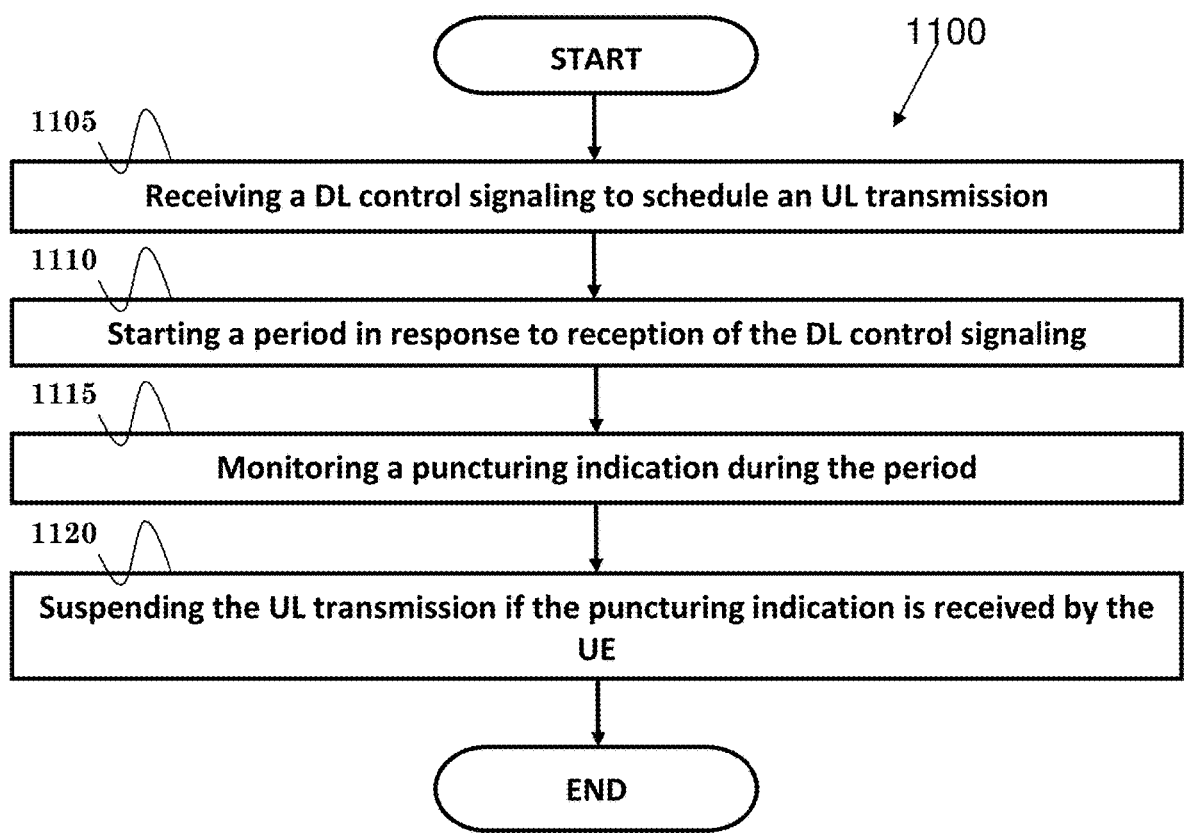
FIG. 11 is a flow chart according to one exemplary embodiment.

FIG. 11 is a flow chart 1100 according to one exemplary embodiment of a UE configured with DRX. In step 1105, the UE receives a DL control signaling to schedule an UL transmission. In step 1110, the UE starts a period in response to reception of the DL control signaling. In step 1115, the UE monitors a puncturing indication during the period. In step 1120, the UE suspends the UL transmission if the puncturing indication is received by the UE.

In one embodiment, the period could be started at a timing when the DL control signaling is received. Alternatively, the period could be started at a timing offset after the DL control signaling is received. In one embodiment, the period could be controlled by a timer. The timer could be a DRX inactivity timer or a DRX UL retransmission timer. The period could end in response to an end of the UL retransmission. Alternatively, the period could end in response to a start of the UL retransmission. The UL transmission could be a new transmission or a retransmission.

Referring back to FIGS. 3 and 4, in one exemplary embodiment of a UE configured with DRX, the device 300 includes a program code 312 stored in the memory 310. The CPU 308 could execute program code 312 to enable the UE (i) to receive a DL control signaling to schedule an UL transmission, (ii) to start a period in response to reception of the DL control signaling, (iii) to monitor a puncturing indication during the period, and (iv) to suspend the UL transmission if the puncturing indication is received by the UE. Furthermore, the CPU 308 can execute the program code 312 to perform all of the above-described actions and steps or others described herein.

Figure 12:
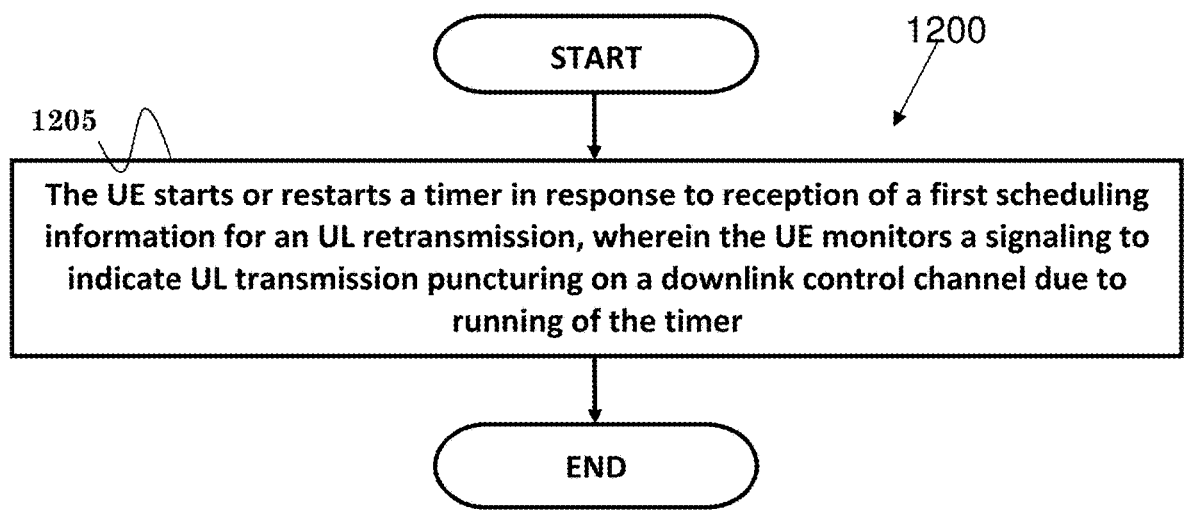
FIG. 12 is a flow chart according to one exemplary embodiment.

FIG. 12 is a flow chart 1200 according to one exemplary embodiment of a UE. In step 1205, the UE starts or restarts a timer in response to reception of a first scheduling information for an UL retransmission, wherein the UE monitors a signaling to indicate UL transmission puncturing on a downlink control channel due to running of the timer.

Referring back to FIGS. 3 and 4, in one exemplary embodiment of a UE, the device 300 includes a program code 312 stored in the memory 310. The CPU 308 could execute program code 312 to enable the UE to start or restart a timer in response to reception of a first scheduling information for an UL retransmission, wherein the UE monitors a signaling to indicate UL transmission puncturing on a downlink control channel due to running of the timer. Furthermore, the CPU 308 can execute the program code 312 to perform all of the above-described actions and steps or others described herein.

Figure 13:
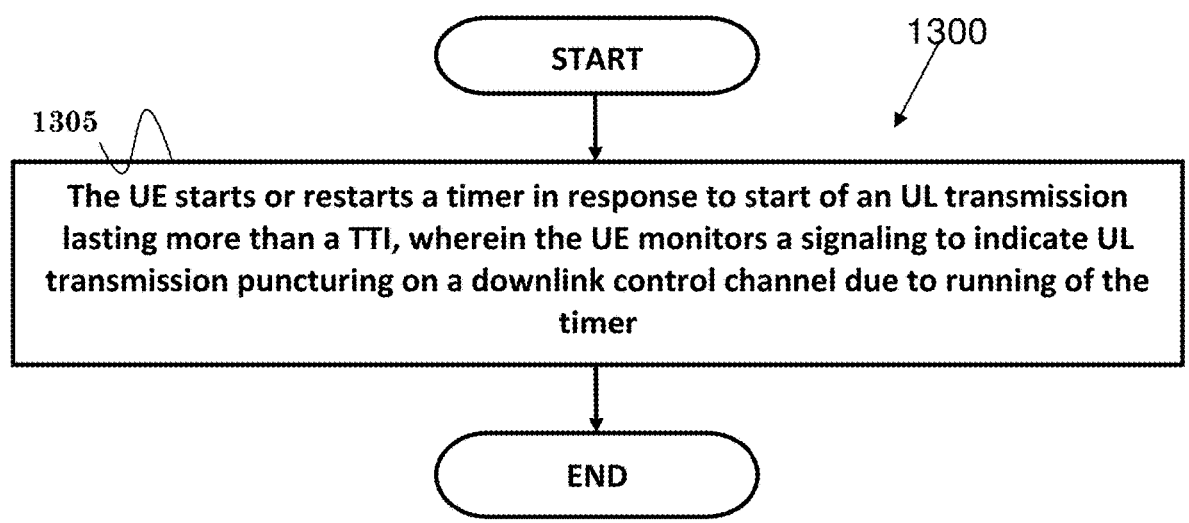
FIG. 13 is a flow chart according to one exemplary embodiment.

FIG. 13 is a flow chart 1300 according to one exemplary embodiment of a UE. In step 1305, the UE starts or restarts a timer in response to start of an UL transmission lasting more than a TTI, wherein the UE monitors a signaling to indicate UL transmission puncturing on a downlink control channel due to running of the timer.

Referring back to FIGS. 3 and 4, in one exemplary embodiment of a UE, the device 300 includes a program code 312 stored in the memory 310. The CPU 308 could execute program code 312 to enable the UE to start or restart a timer in response to start of an UL transmission lasting more than a TTI, wherein the UE monitors a signaling to indicate UL transmission puncturing on a downlink control channel due to running of the timer. Furthermore, the CPU 308 can execute the program code 312 to perform all of the above-described actions and steps or others described herein.

In the context of the embodiments shown in FIGS. 12 and 13 and described above, the timer could be started or restarted in response to reception of a second scheduling information for a new UL transmission. The timer could be stopped in response to an end of the UL (re)transmission. The timer could be a DRX inactivity timer or a DRX (UL) retransmission timer.

In one embodiment, the length of the TTI could be one or multiple subframe(s), slot(s), mini-slot(s), or symbol(s).

In one embodiment, the downlink control channel could be PDCCH or NR-PDCCH.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a User Equipment (UE) configured with Discontinuous Reception (DRX), comprising:
   receiving, from a network node, a configuration to indicate whether an UL (Uplink) transmission can be stopped;
   starting a period in response to start repetitions of the UL transmission;
   monitoring a DL (Downlink) control signaling for a puncturing indication during, before the end of, the period; and
   stopping remaining repetitions of the UL transmission and stopping the period if the puncturing indication is received by the UE and the configuration indicates that the UL transmission can be stopped, wherein the puncturing indication and the configuration are separate information.

2. The method of claim 1, wherein the period is started at a timing when the repetitions of the UL transmission is started.

3. The method of claim 1, wherein the period is started at a timing offset after the repetitions of the UL transmission is started.

4. The method of claim 3, wherein the timing offset is one TTI.

5. The method of claim 1, wherein the repetitions of the UL transmission last more than one TTI (Transmission Time Interval).

6. The method of claim 1, wherein the DL control signaling is transmitted on PDCCH (Physical Downlink Control Channel).

7. The method of claim 1, wherein the DL control signaling indicates an identity of a HARQ (Hybrid Automatic Repeat Request) process, wherein the remaining repetitions of the UL transmission, transmitted by or is to be transmitted by the HARQ process, is stopped.

8. The method of claim 1, wherein the period ends in response to an end of the repetitions of the UL transmission.

9. The method of claim 1, wherein the UE starts the period in response to start of the repetitions of the UL transmission based on an UL transmission characteristic indicating that the UL transmission can be stopped.

10. The method of claim 1, wherein the UE starts the period in response to start of the repetitions of the UL transmission based on if the UL transmission can be stopped.

11. The method of claim 1, wherein length of the period is based on repetition times of the UL transmission.

12. A User Equipment (UE) configured with Discontinuous Reception (DRX), comprising:
   a processor;
   a memory operatively coupled to the processor, wherein the processor is configured to execute a program code to:
   receive, from a network node, a configuration to indicate whether an UL (Uplink) transmission can be stopped;
   start a period in response to start repetitions of the UL transmission;
   monitor a DL (Downlink) control signaling for a puncturing indication during, before the end of, the period; and
   stop remaining repetitions of the UL transmission and stop the period if the puncturing indication is received by the UE and the configuration indicates that the UL transmission can be stopped, wherein the puncturing indication and the configuration are separate information.

13. The UE of claim 12, wherein the period is started at a timing when the repetitions of the UL transmission is started.

14. The UE of claim 12, wherein the period is started at a timing offset after the repetitions of the UL transmission is started.

15. The UE of claim 14, wherein the timing offset is one TTI.

16. The UE of claim 12, wherein the DL control signaling indicates an identity of a HARQ (Hybrid Automatic Repeat Request) process, wherein the remaining repetitions of the UL transmission, transmitted by or is to be transmitted by the HARQ process, is stopped.

17. The UE of claim 12, wherein the period ends in response to an end of the repetitions of the UL transmission.

18. The UE of claim 12, wherein the repetitions of the UL transmission last more than one TTI (Transmission Time Interval).

19. The UE of claim 12, wherein the DL control signaling is transmitted on PDCCH (Physical Downlink Control Channel).

20. The UE of claim 12, wherein the UE starts the period in response to start of the repetitions of the UL transmission based on an UL transmission characteristic indicating that the UL transmission can be stopped.

21. The UE of claim 12, wherein the UE starts the period in response to start of the repetitions of the UL transmission based on if the UL transmission can be stopped.

22. The UE of claim 12, wherein length of the period is based on repetition times of the UL transmission.

* * * * *